United States Patent
Yu et al.

(10) Patent No.: US 7,967,375 B2
(45) Date of Patent: Jun. 28, 2011

(54) HEADREST APPARATUS MOVEABLE IN COOPERATION WITH SEAT BACK

(75) Inventors: Sang Uk Yu, Seoul (KR); Chan Ho Jeong, Seoul (KR); Jung Sang You, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 182 days.

(21) Appl. No.: 12/363,217

(22) Filed: Jan. 30, 2009

(65) Prior Publication Data

US 2010/0052372 A1    Mar. 4, 2010

(30) Foreign Application Priority Data

Aug. 27, 2008   (KR) .................. 10-2008-0083704

(51) Int. Cl.
*A47C 1/02*     (2006.01)
(52) U.S. Cl. ............................. 297/61; 297/15
(58) Field of Classification Search .............. 297/61, 297/15
See application file for complete search history.

(56) References Cited

U.S. PATENT DOCUMENTS

| | | | | |
|---|---|---|---|---|
| 3,065,029 A | * | 11/1962 | Spound et al. | 297/391 |
| 3,132,894 A | * | 5/1964 | Schliephacke | 297/61 |
| 4,856,848 A | * | 8/1989 | O'Sullivan et al. | 297/391 |
| 5,011,225 A | * | 4/1991 | Nemoto | 297/408 |
| 5,181,758 A | * | 1/1993 | Sandvik | 296/68.1 |
| 5,290,091 A | * | 3/1994 | Dellanno et al. | 297/391 |
| 5,681,079 A | * | 10/1997 | Robinson | 297/61 |
| 5,927,804 A | * | 7/1999 | Cuevas | 297/216.12 |
| 6,074,010 A | * | 6/2000 | Takeda | 297/391 |
| 6,511,130 B2 | * | 1/2003 | Dinkel et al. | 297/410 |
| 6,550,856 B1 | * | 4/2003 | Ganser et al. | 297/61 |
| 6,688,697 B2 | * | 2/2004 | Baumann et al. | 297/391 |
| 6,983,995 B1 | * | 1/2006 | Veine et al. | 297/391 |
| 7,059,681 B2 | * | 6/2006 | Kubo | 297/410 |
| 7,118,171 B2 | * | 10/2006 | Fowler et al. | 297/61 |
| 7,140,687 B2 | * | 11/2006 | Hoekstra et al. | 297/410 |
| 7,201,437 B2 | * | 4/2007 | Freijy | 297/61 |
| 7,517,009 B2 | * | 4/2009 | Mauro et al. | 297/61 |
| 7,552,973 B2 | * | 6/2009 | Linardi et al. | 297/408 |
| 7,559,608 B2 | * | 7/2009 | Miyahara et al. | 297/408 |
| 7,631,932 B2 | * | 12/2009 | Hoffmann | 297/216.12 |
| 7,681,955 B2 | * | 3/2010 | Seo | 297/408 |

(Continued)

FOREIGN PATENT DOCUMENTS

JP     11-180197 A     7/1999

(Continued)

*Primary Examiner* — David Dunn
*Assistant Examiner* — David E Allred
(74) *Attorney, Agent, or Firm* — Morgan, Lewis & Bockius LLP

(57) ABSTRACT

A headrest apparatus may include a headrest fixing member connected to a headrest assembly, a guide member connected to a seatback frame inside the seat back, wherein the guide member including a guide portion and a locking portion guides forward and backward movement of the headrest fixing member, at least an elastic member coupling the guide member and the headrest fixing member and configured to bias the headrest fixing member in the forward direction of the seat back so that the headrest fixing member moves in the forward direction and then is locked to the locking portion of the guide member by the elastic member when the seat back is unfolded, and a locking release unit pivotally coupled to the guide member and configured to release the headrest fixing member from the locking portion of the guide member in accordance with the seat back when the seat back is folded.

12 Claims, 16 Drawing Sheets

U.S. PATENT DOCUMENTS

| | | | |
|---|---|---|---|
| 2004/0061370 A1* | 4/2004 | Drew et al. | 297/378.12 |
| 2006/0006720 A1* | 1/2006 | Yamada | 297/378.12 |
| 2007/0236069 A1* | 10/2007 | Chung | 297/408 |
| 2008/0100118 A1* | 5/2008 | Young et al. | 297/404 |

FOREIGN PATENT DOCUMENTS

| | | |
|---|---|---|
| JP | 2005-225246 A | 8/2005 |
| JP | 2007-330515 A | 12/2007 |
| JP | 2008-001171 A | 1/2008 |

* cited by examiner (a)

(b)

HEADREST APPARATUS MOVEABLE IN COOPERATION WITH SEAT BACK

CROSS-REFERENCE TO RELATED APPLICATION

This application claims priority to Korean Patent Application No. 10-2008-0083704 filed on Aug. 27, 2008, the entire contents of which are incorporated herein for all purposes by this reference.

BACKGROUND OF THE INVENTION

1. Field of the Invention

The present disclosure relates to a headrest apparatus moveable back and forth in cooperation with a seat back, and more particularly, to a headrest apparatus moveable back and forth in cooperation with a seat back, in which a headrest assembly including a headrest main body, a headrest frame, and a headrest guide remains in a suitably protruded position in an upright position of the back seat to meet safety regulations on height of the headrest, and is configured to be retreated to a rest position in conjunction with movement of the seat back during folding operation of the seat back, thereby providing convenient folding operation of the backseat.

2. Description of Related Art

Generally, a seat for an automobile includes a seat cushion supporting the hips, a seat back supporting the back of the passenger, and a headrest supporting a neck and a head of an occupant.

The seat back provides supporting force to the back and waist portions for a passenger's comfort. The headrest supports a passenger's neck and head to provide comfort to the neck, and in the event of a rear-end collision, suitably protects the passenger's head and neck by preventing abrupt movement of the head backward.

Recently, in order to maximally utilize vehicle space, folding seats that can be of various structures that allow a seat to be folded to easily carry a large freight are provided. That is, unoccupied seats are tilted forward into a flat position, thereby providing sufficient luggage compartment and flat loading surface.

For example, FIG. 1 illustrates a floor-embeddable seat, which comprises a seat back 2, and a height adjustable head rest 3 that is embeddable into the seat back. The floor-embeddable seat is capable of being kept in a receiving space 1 formed in a floor of a vehicle. Depicted in the accompanying FIG. 2 is a fold-and-dive seat, which is configured to collapse upon folding a seat back 2.

Regarding a general folding seat, North American countries have Regulations on the height of a seat back, which set limitations on the minimum height of the seat back. By lengthening the height of a seat back or a headrest in order to meet those Regulations, the lengthened seat back or headrest may interfere with or protrude into the interior of the vehicle, and may make the folding operation itself impossible.

According to current seat back and headrest related Regulations, the height of an upper end of the headrest should be at least 750 mm. An exception to this Regulation is shown in exemplary FIG. 3. FIG. 3 exemplifies a case where a front projection height S of a headrest 3 from the front side of a seat back 2 exceeds 40 mm, and the Regulations are suitably loosened. Accordingly, if a height (HLE) between a hip (H)-point of a seat cushion and a lower end of the headrest 3 exceeds 460 mm, it is deemed that the regulation is satisfied (new regulation FMVSS (Federal Motor Vehicle Safety Standards) 202a).

With a shorter seat back, the folding operation of the seat back becomes convenient. However, since the front projection height S of the headrest should be at least the regulated value, the front side of the headrest may interfere with the seat cushion when the seat back is tilted in a flat position. Accordingly, the seat back may not be able to be fully tilted to the seat cushion.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE DISCLOSURE

Various aspects of the present invention are directed to provide a headrest apparatus that is moveable back and forth in cooperation with a seat back, in which a headrest assembly remains in a suitably protruded position in an upright position of the seat back to meet safety regulations on height of the headrest, and is suitably configured to be automatically retreated to a rest position in conjunction with movement of the seat back during folding operation of the seat back.

In one aspect of the present invention, a headrest apparatus moveable from and to a seat back in cooperation with movement of the seat back, the apparatus may include a headrest fixing member connected to a headrest assembly and selectively movable in a forward or backward direction in the seat back, a guide member connected to a seatback frame inside the seat back, wherein the guide member including a guide portion and a locking portion guides forward and backward movement of the headrest fixing member, at least an elastic member coupling the guide member and the headrest fixing member and configured to bias the headrest fixing member in the forward direction of the seat back so that the headrest fixing member moves in the forward direction along the guide portion of the guide member and then is locked to the locking portion of the guide member by an elastic force of the elastic member when the seat back is unfolded, and a locking release unit pivotally coupled to the guide member and configured to release the headrest fixing member from the locking portion of the guide member in accordance with operation of the seat back when the seat back is folded.

The headrest fixing member may include a headrest guide coupled to the headrest assembly to receive a headrest frame.

The headrest fixing member may include an upper horizontal rod, a connection plate connected to the headrest guide and upper end of which is fixed to the upper horizontal rod, and a lower horizontal rod fixed to a lower end of the connection plate, wherein the upper and lower horizontal rods coupled to the elastic member are slidably coupled to the guide member.

The elastic member may include a first spring coupling the upper horizontal rod and the guide member and a second spring coupling the lower horizontal rod and the guide member.

The elastic member may be coupled to the guide member with a predetermined angle with respect to longitudinal axis of the guide portion of the guide member toward the locking portion of the guide member.

The guide portion and the locking portion of the guide member may be slot.

The locking release unit may include a locking release lever rotatably coupled to the guide member and configured to release the headrest fixing member from the locking portion of the guide member while the seat back is folded, and a release lever drive unit configured to activate the locking release lever by rotational force of the seat back while the seat back is folded, wherein the release lever drive unit is fastened to a cushion frame pivotally connected to the seat back frame to activate the locking release lever by rotational force of the seat back frame.

The release lever drive unit may further include a guide fastened to the cushion frame and including a guide slot to which a cable pin installed at one end of a cable coupled to the locking release lever is inserted and coupled, and a working protrusion configured to protrude from a lower end of the seat back frame to move the cable pin along the guide slot of the guide around a rotation center of the seat back frame while the seat back is folded so as to allow the cable to be pulled to rotate the locking release lever.

The headrest assembly may contact a seat cushion and is pressed backwards by the seat cushion after the headrest fixing member is released from the locking portion of the guide member while the seat back is folded, and moves into the seat back by the pressing force.

In another aspect of the present invention, the apparatus may further include a slide drive unit, one end of which is coupled to the headrest fixing member, the slide drive unit being configured to deliver rotational force of the seat back to the headrest fixing member to move backwards to the seat back the headrest fixing member disposed in the guiding portion of the guide member while the seat back is folded.

The other end of the slide drive unit may be fastened to a cushion frame pivotally connected to the seat back frame to activate the headrest fixing member by rotational force of the seat back frame to move the headrest fixing member backwards in the guide portion of the guide member while the seat back is folded.

The other end of the slide drive unit may include a guide fastened to the cushion frame and including a guide slot to which a cable pin installed at one end of a cable coupled to the headrest fixing member is inserted and coupled, and a working protrusion configured to protrude from a lower end of the seat back frame to move the cable pin along the guide slot of the guide around a rotation center of the seat back frame while the seat back is folded so as to allow the cable to be pulled to move the headrest fixing member backwards.

In further another aspect of the present invention, a headrest apparatus moveable back and forth in cooperation with a seat back, may include a headrest assembly having a stopper member integrally installed therein, a guide member installed inside the seat back, the guide member being configured to lock the stopper member when the stopper member is positioned at a front end of the guide member, elastic members, and a locking release unit for releasing locking state of the stopper member, which is locked in the guide member, upon folding operation of the seat back, wherein the headrest assembly, which is operative in conjunction with movement of the stopper member built therein, slides back and forth in cooperation with folding and unfolding operations of the seat back.

In still another aspect of the present invention, a method for operating a headrest apparatus moveable back and forth, may include releasing a stopper member of a headrest assembly, which is locked to a locking portion of a guide member of a seat back in an upright position of the seat back, by rotational force of a locking release unit transferred from rotation of the seat back during folding operation of the seat back, and moving, after the stopper member is released from the locking portion of the guide member, the headrest assembly into the seat back by backwardly moving the stopper member along a guide portion of the guide member installed in the seat back, wherein the guide member is connected to a seatback frame of the seat back.

While the seat back is unfolded, the stopper member disposed backwards in the seat back may be elastically moved along the guide portion of the guide member forwards and then locked to the locking portion of the guide member by elastic force of elastic members coupling the stopper member and the guide member, and simultaneously, the headrest assembly integrally formed with stopper member moves forwards from the seat back and then is locked.

The headrest assembly may contact a seat cushion and is pressed backwards by the seat cushion after the stopper member is released from the locking portion of the guide member while the seat back is folded, and moves into the seat back by the pressing force.

The headrest assembly may move backwards while a slide drive unit coupled to the stopper member receives rotational force of the seat back and moves the headrest assembly into the seat back while the seat back is folded.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

As described herein, the present invention includes a headrest apparatus moveable back and forth in cooperation with a seat back, the apparatus comprising a headrest assembly having a stopper integrally installed therein, a guide member installed inside the seat back, the guide member being configured to lock the stopper when the stopper is positioned at a front end of the guide member, elastic members, and a locking release unit for automatically releasing the stopper, which is locked in the guide member, upon folding operation of the seat back, wherein the headrest assembly, which is operative in conjunction with the slide movement of the stopper built therein with respect to the guide member of the seat back, slides back and forth in cooperation with folding and unfolding operations of the seat back.

In various embodiments the stopper movies back and forth in the seat back.

In other embodiments, the guide member engages with the stopper in such a manner that the slide movement of the stopper is guided thereby.

In further other embodiments, the elastic members are installed between the stopper and the guide member, by which the stopper automatically moves to the front end of the guide member and then is locked in the guide member when the seat back is unfolded.

In other further embodiments, the folding operation of the seat back is by means of rotational force of the seat back.

The invention can also include a motor vehicle comprising the headrest apparatus of any one of the aspects as described herein.

Hereinafter, other features will be apparent from the description below with reference to the accompanying drawings. Terms and words used in the present specification and the appended claims should be construed as meanings and concepts that comply with the spirit of the present invention on the basis of a principle that an inventor can properly define the concept of a term in order to explain the subject matter that the inventor regards as his disclosure in a best way.

Figure 1:
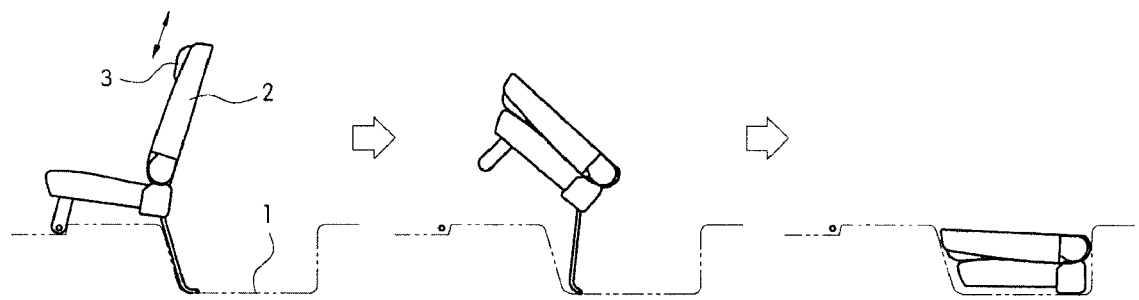
FIG. 1 is a view illustrating a conventional car body floor storage type seat.
Figure 2:
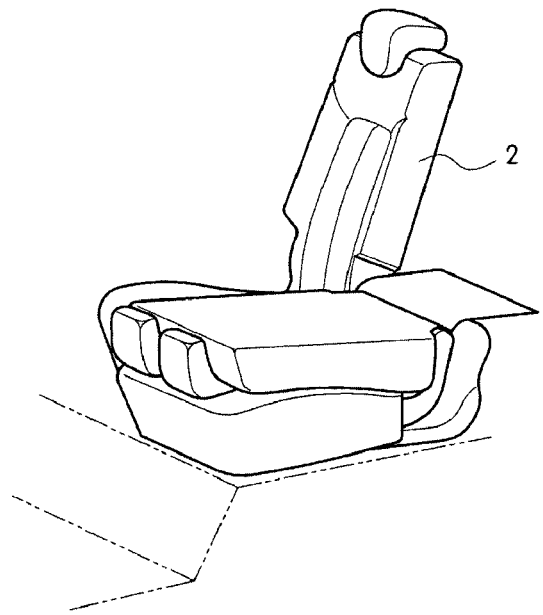
FIG. 2 is a view illustrating a conventional fold and dive seat.
Figure 3:
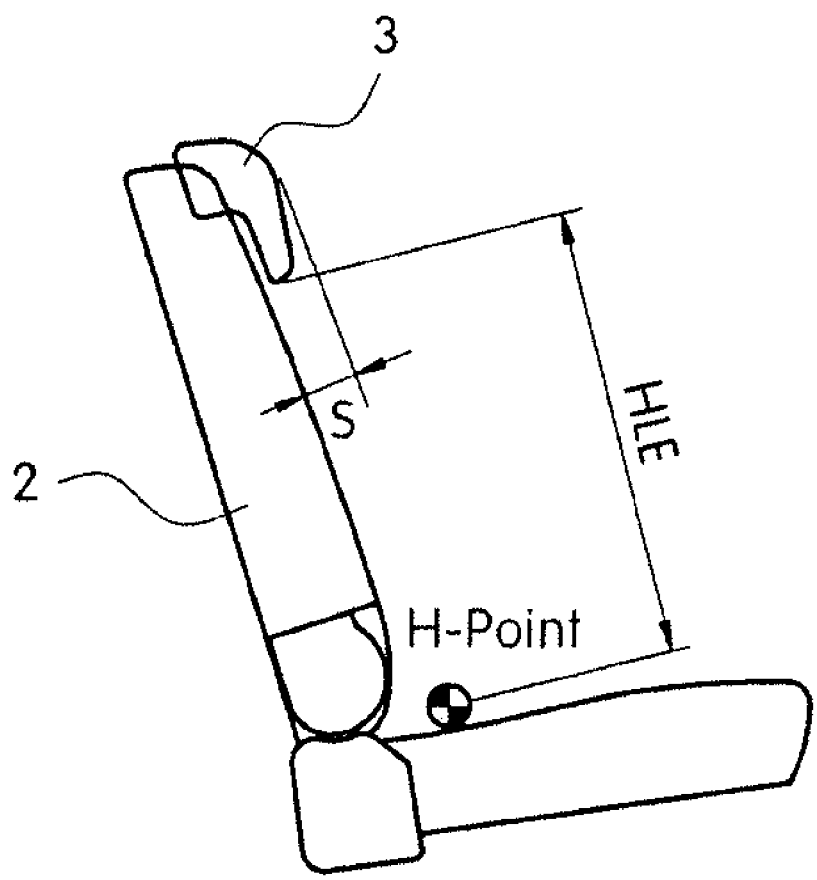
FIG. 3 is a view explaining a seat related regulation.
Figure 4:
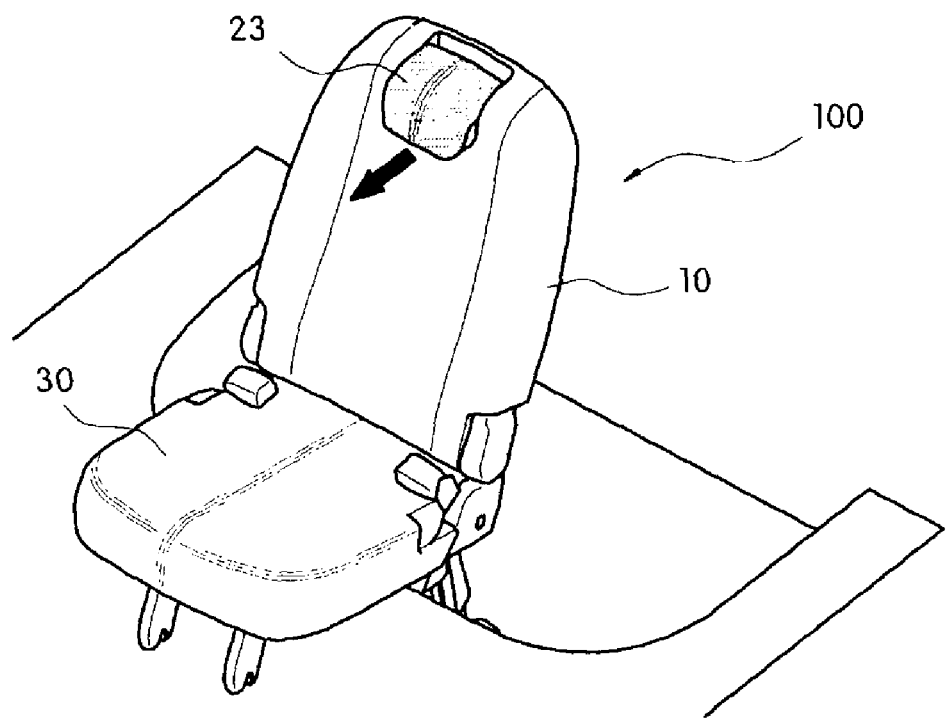
FIG. 4 is a perspective view of a seat on which a headrest according to an exemplary embodiment of the present invention is mounted.
Figure 4:
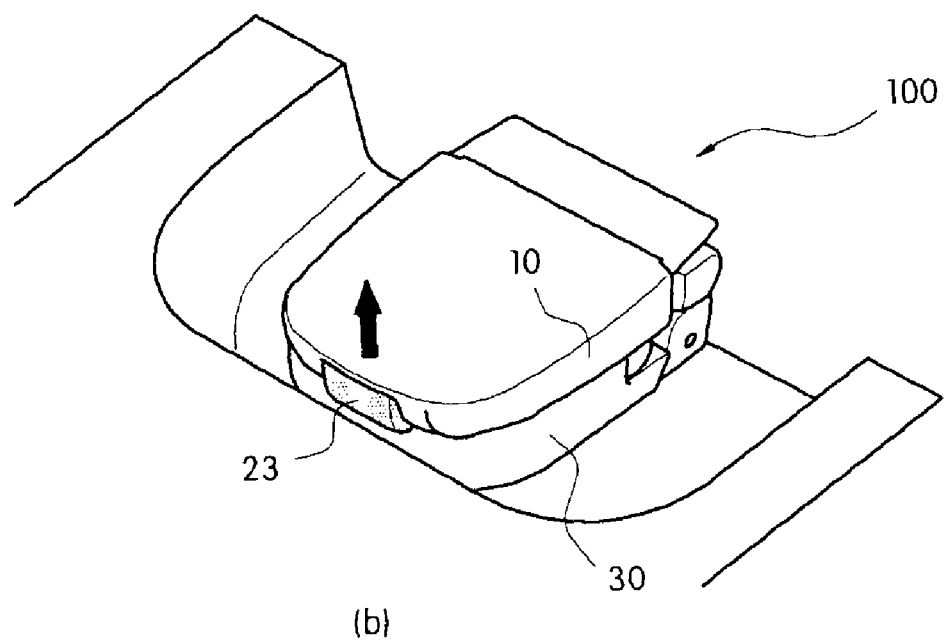

FIG. 4 is a perspective view of a seat on which a headrest according to various embodiments of the present invention is suitably mounted, and illustrates an exemplary embodiment in which the present invention is suitably applied to the car body floor storage type seat. FIG. 4(*a*) illustrates an exemplary seat state where a passenger can sit with a headrest main body 23 at the upper end of the seat back 10 slid to the front, and FIG. 4(*b*) illustrates an exemplary seat 100 that is sunk (seat back is folded) with the headrest main body 23 slid to the rear.

Figure 5:
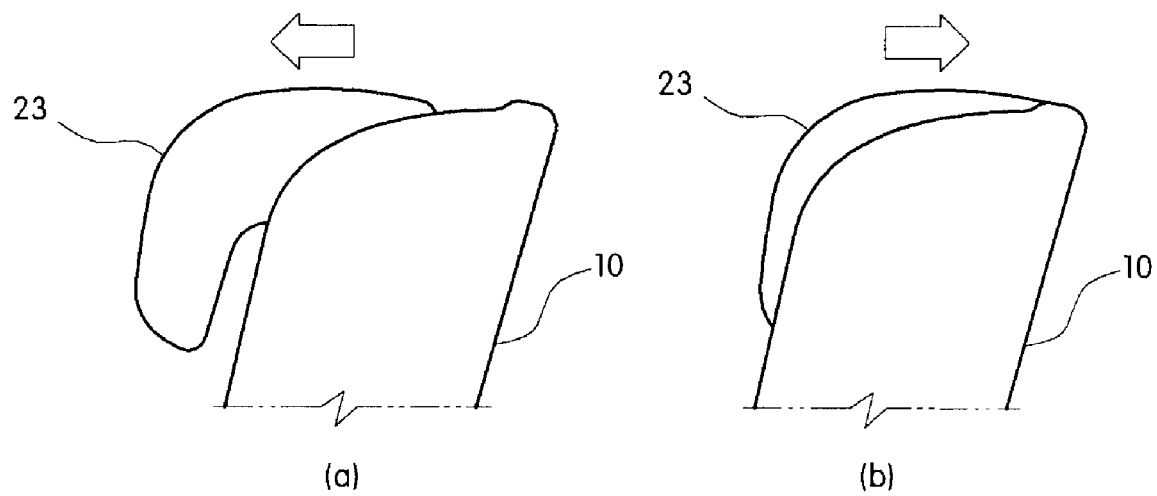
FIG. 5 is a side view illustrating a headrest assembly slid to the front and to the rear in a seat according to an exemplary embodiment of the present invention.

FIG. 5 is a side view illustrating an exemplary headrest assembly slid to the front and to the rear in a seat according to various embodiments of the present invention. FIG. 5(*a*) illustrates the headrest assembly slid to the front while a passenger sits, and FIG. 5(*b*) illustrates the headrest assembly slid to the rear while a seat is sunk.

Hereinafter, in certain embodiments, the headrest assembly 20 in the specification includes a headrest frame 21, a headrest guide 22, a headrest main body 23, and a headrest fixing member 41 (refer to FIGS. 9 to 11). Also, a headrest apparatus according to further exemplary embodiments of the present invention suitably includes the headrest assembly 20 and a drive for sliding the headrest assembly back and forth.

In other exemplary embodiments, the headrest apparatus according to the present invention is suitably applied to a helmet type and back-buried type headrest. For example, in certain embodiments, while a passenger sits, the entire headrest assembly including the headrest main body 23 is slid from a seat back 10 to the front and suitably locked there to satisfy a regulation value S (40 mm or more) of a front projection height. In other embodiments, while the seat 100 is sunk, the headrest main body 23 is pressed by a seat cushion 30 and slid to the rear to allow the seat back 10 to be swiftly folded. Accordingly, since the headrest main body 23 moves to the rear and does not suitably protrude during a sinking operation, the seat back 10 can be swiftly folded to the seat cushion 30.

The headrest drive unit according to various embodiments of the present invention suitably locks the headrest assembly while the headrest assembly slid to the front, automatically releases the locking of the headrest assembly (slid to the front) in cooperation with the folding operation of the seat back 10, and simultaneously, suitably allows the headrest assembly to be slid to the rear by pressing of the seat cushion 30. In further exemplary embodiments, during restoration of the seat back 10 (unfolding of the seat back 10), the headrest assembly is automatically slid to the front and then locked.

Figure 6:
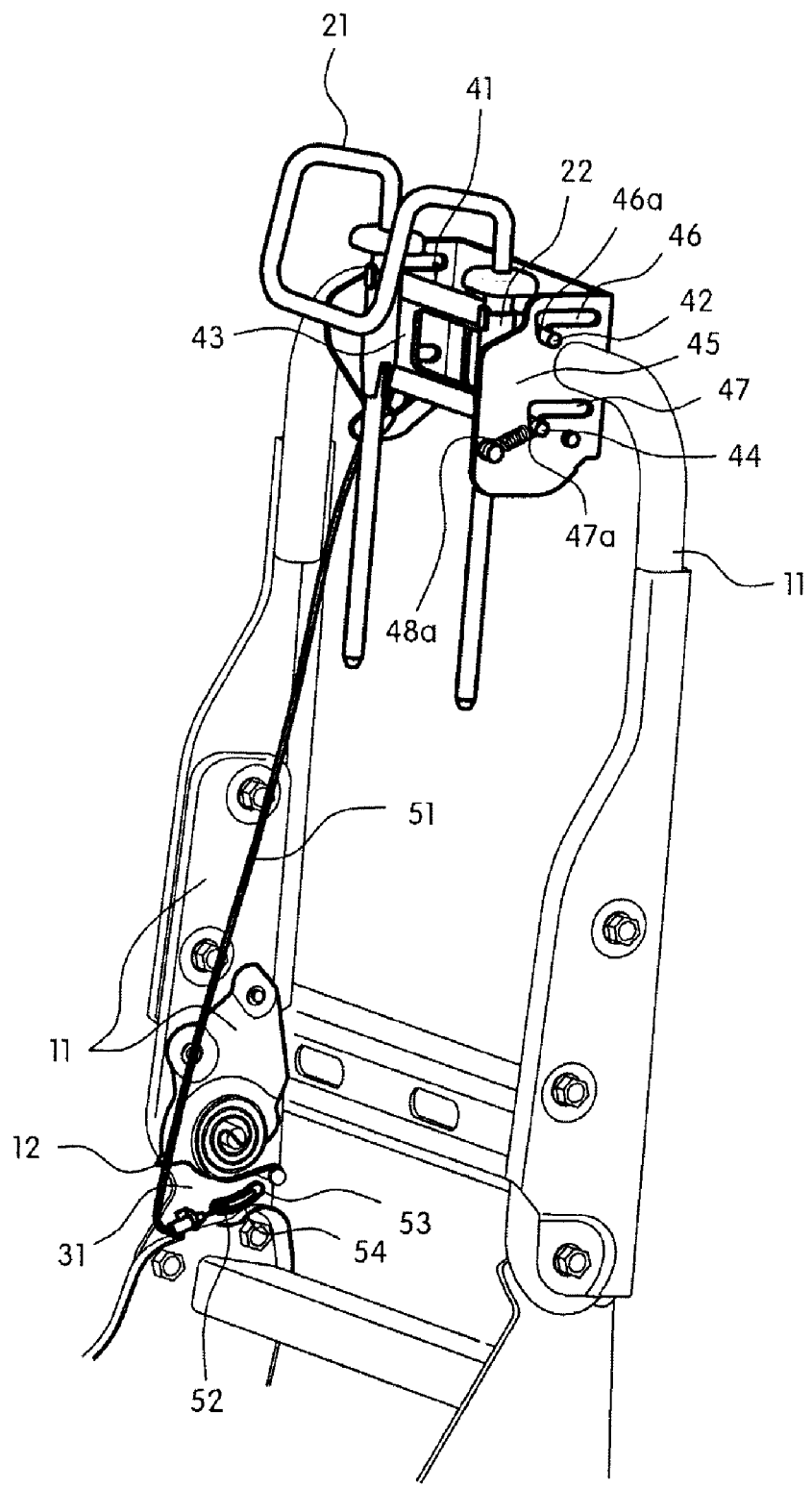
FIG. 6 is a perspective view illustrating the construction of a seat back to which a headrest according to an exemplary embodiment of the present invention is applied.
Figure 7:
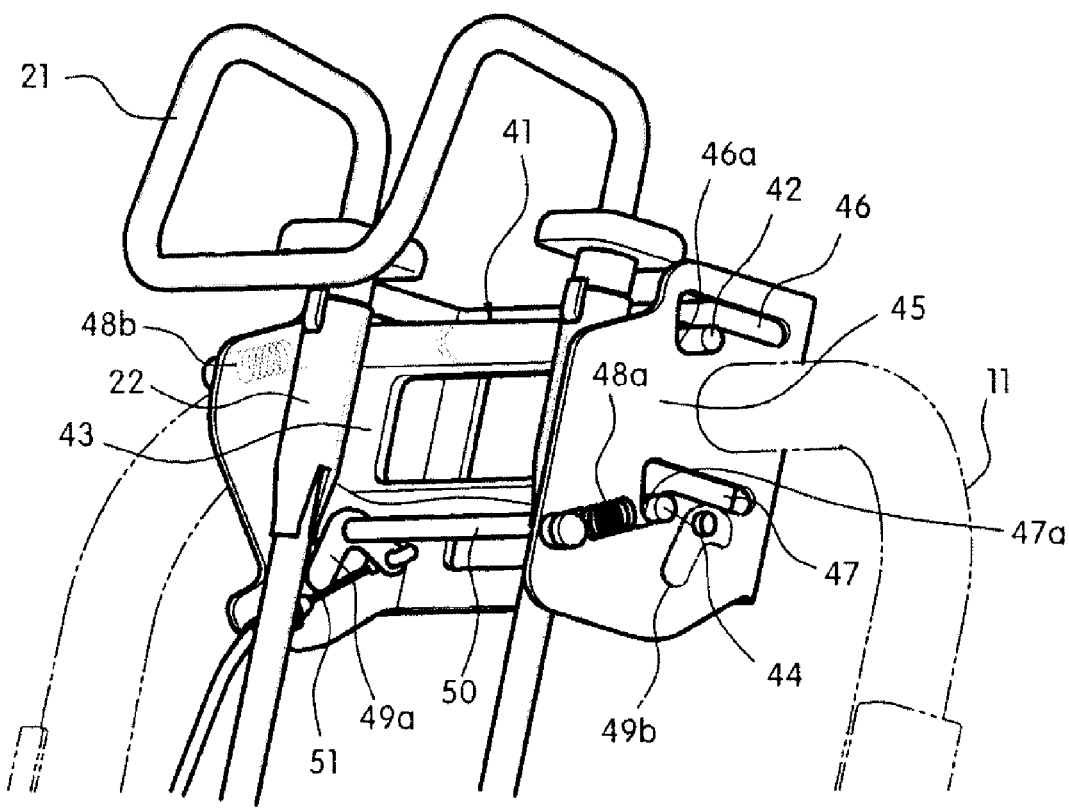
FIGS. 7 and 8 are detailed views illustrating the upper and lower constructions of a seat back according to an exemplary embodiment of the present invention, respectively.
Figure 8:
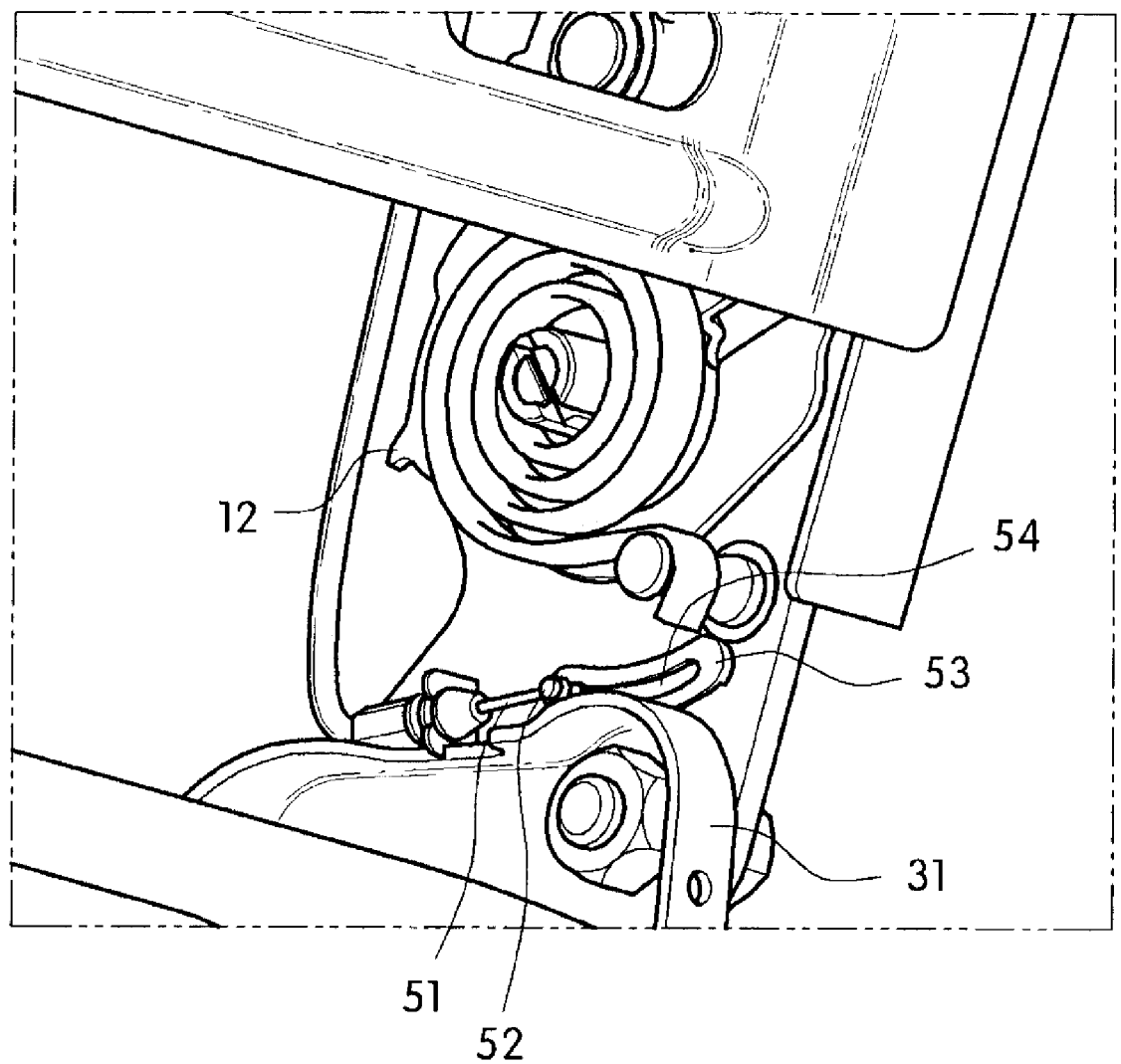

FIG. 6 is an exemplary perspective view illustrating the exemplary construction of a seat back to which a headrest according to various embodiments of the present invention is suitably applied. FIGS. 7 and 8 are exemplary detailed views illustrating the upper and lower constructions of a seat back, respectively, according to other exemplary embodiments, and FIGS. 9 to 11 are views illustrating the constructions and operation states of a locking release lever and a release lever drive unit in a headrest apparatus according to other exemplary embodiments of the present invention.

The headrest apparatus according to exemplary embodiments of the present invention suitably includes a headrest assembly 20 on which a stopper moving back and forth from the seat back 10 in a sliding manner is integrally installed; a guide member 45 fixedly installed inside the seat back, allowing the stopper to be coupled such that the stopper moves back and forth in a sliding manner, and locking the stopper that has moved to the front while suitably guiding back and forth movement of the stopper; elastic members 48*a* and 48*b* installed between the stopper and the guide member to allow the stopper to elastically move to the front from the guide member and is automatically locked while the seat back is unfolded; and a locking release unit delivering rotational force of the seat back while the seat back is folded to suitably automatically release a locking state of the stopper locked in the guide member.

Hereinafter, respective elements according to further exemplary embodiments of the invention will be described in more detail with reference to the accompanying drawings. Reference numerals 21, 22, and 23 represent a headrest frame, a headrest guide, and a headrest main body, respectively (refer to FIGS. 9 to 11). The headrest main body is not illustrated in FIGS. 6 to 8 so that the principal constructions of the present invention can be clearly shown.

According to various embodiments of the invention as described herein, like a general headrest apparatus, a stay portion of the headrest frame 21 is suitably assembled by being inserted into the headrest guide 22. The heights of the headrest frame 21 and the headrest main body 23 are adjusted when the stay portion moves vertically while it is suitably inserted into the headrest guide 22, the headrest guide 22 supports the headrest main body and the headrest frame 21 inside the seat back 10. Further, while the height of the headrest is adjusted, the headrest guide 22 guides the stay portion vertically.

According to further embodiments of the present invention, the headrest assembly 20 including the headrest frame 21, the headrest guide 22, and the headrest main body 23, and the headrest fixing member 41 is suitably configured to slide from the guide member to back and forth by the medium of the stopper described below in cooperation with folding/unfolding operations of the seat back 10.

The stopper may be integrally installed to the headrest assembly 20, and suitably serve as both-end fitting portions of an upper horizontal rod 42 and a lower horizontal rod 44. The stopper is suitably coupled to the guide member 45 (for example, which is a headrest slide guide described later) inside the seat back 10 to move back and forth in a sliding manner integrally with the headrest assembly in the guide member while the headrest assembly slides back and forth.

When the seat back 10 rotates to the seat cushion 30 and is suitably folded, the front side of the headrest main body 23 contacts the seat cushion fixed on the lower side on the first place, and is then pressed, so that the headrest main body 23 automatically slides to the rear. At this point, in further embodiments, when the front side of the headrest main body contacts the upper surface of the seat cushion and the seat back 10 then rotates downward further, the seat cushion 30 pushes upward the front side of the headrest main body 23. Accordingly, in related embodiments, the entire headrest assembly 20 is raised upward, and consequently, slid to the rear of the folded seat back 10. On the other hand, in other embodiments, when the seat back 10 is unfolded, pressing by the seat cushion 30 is released and the entire headrest assembly 20 is automatically slid to the front and then locked by elastic forces of the elastic members 48a and 48b which will be described herein.

In exemplary embodiments of the present invention, the back and forth sliding movement of the headrest assembly 20 is generated in cooperation with the folding/unfolding operations of the seat back 10. In certain embodiments, after the front side of the headrest main body 23 contacts the seat cushion 30 as described above, the headrest main body 23 is pressed by the seat cushion, so that the entire headrest assembly is slid to the rear. During a sliding operation to the front, with the pressing by the seat cushion 30 released, the headrest assembly 20 is pulled to the front by the elastic force (restoring force) of the elastic members 48a and 48b and so elastically moves, the stopper (a portion of the headrest assembly directly pulled by the elastic members and locked to the guide member) is pulled and moved from the guide member 45 to the front, and locked at the guide member by the elastic force of the elastic members 48a and 48b installed between the guide member 45 and the stopper.

According to further exemplary embodiments, the headrest fixing member 41 is fixedly installed on the rear side of the headrest guide 22. The headrest fixing member 41 includes an upper horizontal rod 42 horizontally fixed on the rear side of the headrest guide 22, a connection plate 43, an upper end of which is fixedly coupled to the upper horizontal rod 42, and a lower horizontal rod 44 fixedly coupled to the lower end of the connection plate 43 and disposed in parallel to the upper horizontal rod 42.

In other embodiments, the headrest fixing member 41 is integrally fixed to the rear of the headrest guide 22, and is suitably configured to integrally move with the headrest guide 22 and the headrest frame 21 assembled to the headrest guide 22 during a back and forth sliding operation.

In other further embodiments, a plate-shaped headrest slide guide 45 as the above-mentioned guide member, suitably allowing the headrest fixing member 41 to be moved and locked to the front while guiding the headrest fixing member 41 back and forth, is fixedly installed left and right at the upper end of a seat back frame 11. The headrest slide guide 45 supports the headrest fixing member 41, and the entire headrest assembly 20 including the headrest guide 22, the headrest frame 21, and the headrest main body 23 at the seat back frame 11.

A guide slot 46 formed long back and forth is provided in each headrest slide guide 45. In related embodiments, a locking slot 46a in which an additional hole is formed downward extends from the front end of the guide slot 46.

Guide slots 46 are suitably formed in the upper and lower positions, respectively, of each headrest slide guide 45. The upper horizontal rod 42 of the headrest fixing member 41 is suitably coupled to the upper guide slot 46, and the lower horizontal rod 44 of the headrest fixing member 41 is coupled to the lower guide slot 47. In further embodiments, the both-end fitting portions of the upper horizontal rod 42 and the lower horizontal rod 44 are suitably inserted and coupled to the corresponding guide slots 46 and 47, respectively, so that the upper horizontal rod 42 and the lower horizontal rod 44 slide back and forth along the shapes of the guide slots 46 and 47. Here, the both-end fitting portions suitably serve as the stopper of the above-described headrest assembly.

Accordingly, in exemplary embodiments, with the headrest fixing member 41 coupled to the headrest slide guide 45, the headrest fixing member 41 moves back and forth along the shape of the guide slots 46 and 47. At this point, the headrest fixing member 41, and the headrest guide 22, the headrest frame 21, and the headrest main body can suitably slide back and forth.

In other embodiments of the invention as described herein, the headrest fixing member 41 is suitably locked with the both-end fitting portions of the upper horizontal rod 42 and the lower horizontal rod 44 fit downward in the locking slots 46a and 47a of the corresponding guide slots 46 and 47 by the elastic members 48a and 48b. At this point, the entire headrest assembly including the headrest fixing member 41 is suitably restricted, so that a rearward sliding operation along the guide slots 46 and 47 is prevented, and simultaneously, the headrest is projected to a regulated height toward the front from the front side of the seat back.

Further, first and second return springs 48a and 48b as elastic members suitably installed between the headrest fixing member 41 and the headrest slide guide 45 to move the entire headrest assembly including the headrest fixing member 41 using the elastic force of the first and second return springs 48a and 48b to the front from a state moved to the rear, are provided.

First, the front end of the first return spring 48a is suitably fixed to the front lateral portion of the headrest slide guide 45, and the rear end is suitably fixed to the headrest fixing member 41, more specifically, the fitting portion, which is one end of the lower horizontal rod 44 in the headrest slide guide 45. Accordingly, the position of the headrest slide guide 45 where the front end of the first return spring 48a is fixed becomes the front lower portion from the lower guide slot 47.

Accordingly, in exemplary embodiments, the first return spring 48a pulls the headrest to the front to lock the headrest during restoration of the seat back (unfolding of the seat back) from a state where the headrest remains slid to the rear after folding of the seat back. In further related embodiments, the fitting portion of the lower horizontal rod 44 is pulled to the front by the first return spring 48a, and is then pulled downward so that it is fit into the locking slot 47a of the headrest slide guide 45, the fitting portion of the lower horizontal rod 44 on the opposite side is suitably fit into the locking slot of the lower guide slot formed in the same shape on the opposite side of the headrest slide guide 45, the both-end fitting portions of the lower horizontal rod 44 are simultaneously suitably fit into the locking slots 47a of the lower guide slots 47 and locked there by the elastic force of the first return spring 48a.

In other further embodiments, the front end of the second return spring 48b is fixed to the front lateral portion of the headrest slide guide 45, and the rear end is fixed to the fitting portion, which is one end of the upper horizontal rod 42 of the headrest fixing member 41 in the headrest slide guide 45. In related embodiments, the rear end of the second return spring 48b is fixed to the fitting portion, which is a left end of the upper horizontal rod 42 when viewed from the drawing. In further embodiments, the position of the headrest slide guide 45 where the front end of the second return spring 48b is fixed becomes the front lower portion from the upper guide slot 46.

As described herein, the first return spring 48a is suitably connected to the fitting portion, which is the right end of the lower horizontal rod 44 when viewed from the drawing, and the second return spring 48b is connected to the fitting portion, which is the left end of the upper horizontal rod 42 when viewed from the drawing. In exemplary embodiments, during restoration of the seat back (unfolding of the seat back), the first return spring 48a and the second return spring 48b suitably disposed on a diagonal direction pull simultaneously and stably the right end of the lower horizontal rod 44 and the left end of the upper horizontal rod 42 to lock the upper and lower horizontal rods 44 and 42 in the corresponding locking slots, respectively.

Referring to FIG. 7, a cable 51 in various embodiments of the present invention is suitably connected to a locking release lever 49a on the left, the first return spring 48a is connected to the right end of the lower horizontal rod 44, and the second return spring 48b is connected to the left end of the upper horizontal rod 42. As described herein, in exemplary embodiments, the first return spring 48a and the second return spring 48b stably pull in a diagonal direction the headrest fixing member 41 integrally formed with the connection plate 43, so that the headrest fixing member 41 can be locked more swiftly. Accordingly, spring force, that is, spring elastic force pulling the fixing bracket (the fixing member 41) is properly distributed to both left and right sides along a diagonal direction, and applied to the fixing bracket 41.

In further embodiments, the locking release levers 49a and 49b forming the locking release unit are suitably coupled on the inner side of the headrest slide guide 45 so that they are rotatable by a hinge rod 50. The two locking release levers 49a and 49b on the left and right are suitably connected and integrally rotated by the hinge rod 50. The left locking release lever 49a of the two locking release levers 49a and 49b on one side is rotated by a release lever drive unit using the cable 51 to push the left fitting portion of the lower horizontal rod 44 upward such that the left fitting portion is released from the locking slot 47a of the guide slot 47. Simultaneously, the right locking release lever 49a on the other side rotates integrally with the left locking release lever 49a on the opposite side by the medium of the hinge rod 50 to push the right fitting portion of the lower horizontal rod 44 upward such that the right fitting portion is released form the locking slot 47a of the guide slot 47.

The locking release levers forming the locking release unit, and the release lever drive unit according to exemplary embodiments of the present invention are described below in more detail with reference to FIGS. 9 to 11.

Figure 9:
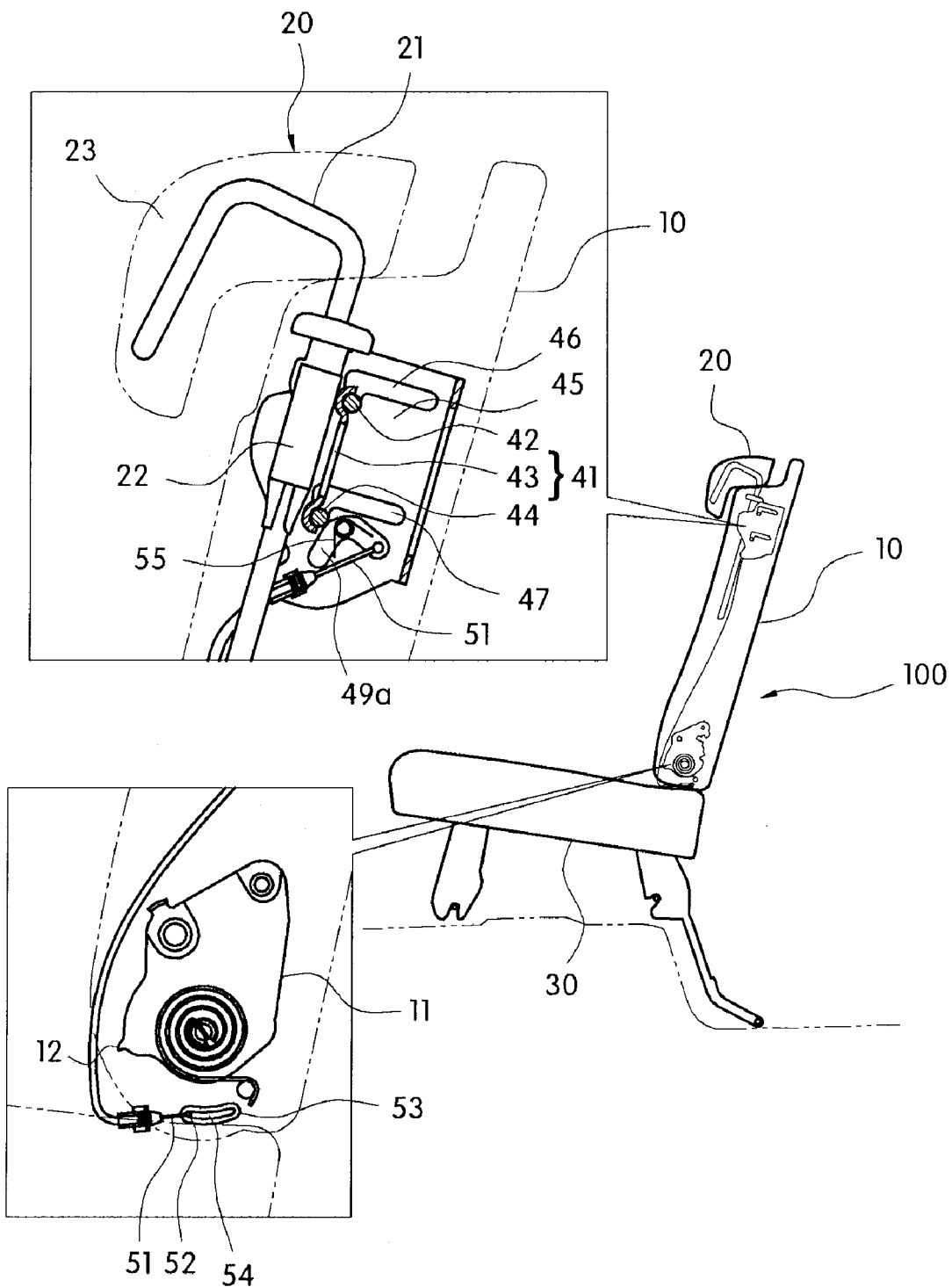
FIGS. 9 to 11 are views illustrating the constructions and operation states of a locking release lever and a release lever drive unit in a headrest apparatus according to an exemplary embodiment of the present invention.
Figure 11:
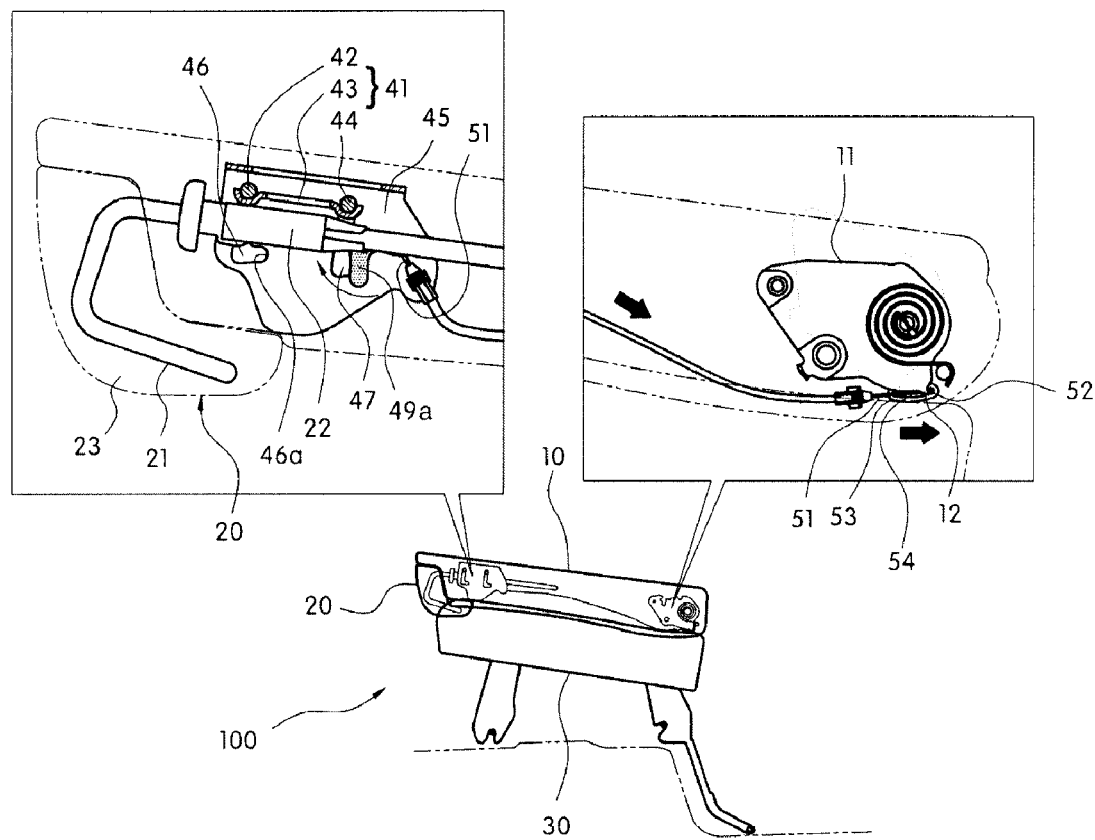

According to certain embodiments, and for example referring to FIGS. 9 and 11, the two locking release levers 49a and 49b are hinge-coupled on the inner side of the headrest slide guide 45 by the medium of the hinge rod 50, and are suitably configured to be rotatable around the hinge rod 50, the hinge rod 50 is suitably rotatably mounted on the headrest slide guide 45 on the left and right, and in other further embodiments the locking release levers 49a and 49b are integrally and fixedly installed at both ends of the hinge rod 50, respectively, on the inner sides of the headrest slide guide 45 on the left and right.

In other further embodiments, one end of the cable 51, which is an element of the release lever drive unit, is connected to one end of the left locking release lever 49a to allow the left locking release lever 49a to be suitably rotated by pulling of the cable 51.

In exemplary embodiments, when the locking release lever 49a on one side is pulled and so rotated by the cable 51, the end portions of the two locking release levers 49a and 49b are connected by the hinge rod 50 to suitably push upward simultaneously the headrest fixing member 41 coupled to the headrest slide guide 45. In further exemplary embodiments, the two locking release levers 49a and 49b push upward the both-end fitting portions of the lower horizontal rod 44 so that the both-end fitting portions are released from the locking slots 47a of the guide slots 47 simultaneously. Consequently, in further embodiments, both the upper horizontal rod 42 and the lower horizontal rod 44 connected by the connection plate 43 are released from the locking slots 46a and 47a of the guide slots 46 and 47 to move upward, so that a locking state is suitably released.

Accordingly, when the locking release lever 49a on one side directly driven by the cable 51 suitably rotates, the hinge rod 50 connected to the locking release lever 49a and the locking release lever 49b on the other side fixed at the end on the opposite side of the hinge rod 50 rotate simultaneously, so that the locking state of the headrest is released.

In related embodiments, the release lever drive unit releasing the locking state of the headrest includes the cable 51, a cable guide 53, and a working protrusion 12. One end of the cable 51 is coupled to the locking release lever 49a, and a cable pin 52 is installed to the other end of the cable 51, in related embodiments, the cable guide 53 is fixedly installed to a cushion frame 31. Further, a guide slot 54 is formed long back and forth in the cable guide 53 to receive the cable pin 52, so that the other end of the cable 51 is coupled to the cable guide 53. In further embodiments, the working protrusion 12 protrudes from the lower end of the seat back frame 11 to push the cable pin 52 to the rear along the guide slot 54 of the cable guide 53 to allow the cable 51 to be pulled (refer to FIG. 8 hereinafter).

In other embodiments, the cable guide 53 is suitably fixed to the cushion frame 31 and guides the cable pin 52 back and forth, the cable pin 52 is inserted into the guide slot 54 of the cable guide 53 and guided along the back and forth direction of the guide slot 54.

The cable pin 52 is inserted into the guide slot 54 and protrudes to the lateral direction so that it can be rotatably pressed by the working protrusion 12 of the seat back frame 11. In certain embodiments, during the folding operation of the seat back, while the seat back frame 11 rotates, the working protrusion 12 rotates in the counterclockwise direction in FIG. 8 to push the cable pin 52 to the rear. At this point, the cable pin 52 moves to the rear along the guide slot 54 of the cable guide 53. While the cable pin 52 moves to the rear, the cable 51 is pulled, so that the locking release lever 49a rotates in the clockwise direction in FIG. 7.

As described herein, a driving unit of a sliding headrest apparatus cooperating with a seat back has been suitably described. The operation of the driving unit is described hereinafter.

FIG. 9 is an exemplary view of a seat on which a passenger can sit. Before the seat back is suitably folded, the headrest assembly 20 projects from the front side of the seat back 10. FIG. 10 illustrates an exemplary seat back folding operation being performed, and FIG. 11 illustrates a seat back folding operation being completed, the seat back folding operation is completed when the headrest assembly 20 is slid to the rear.

In certain embodiments, for example in referring to the upper portion of FIG. 9, the upper horizontal rod 42 and the lower horizontal rod 44 are fit into the locking slots 46a and 47a, which are the front ends of the guide slots 46 and 47 of the headrest slide guide 45, so that the headrest fixing member 41 is locked. While the headrest fixing member 41 is locked as described above, the entire headrest assembly 20 including the headrest main body 23, the headrest frame 21, and the headrest guide 22 projects to the front, and rear movement is limited. That is, the headrest assembly 20 remains slid to the front and projects from the front side of the seat back 10.

Figure 10:
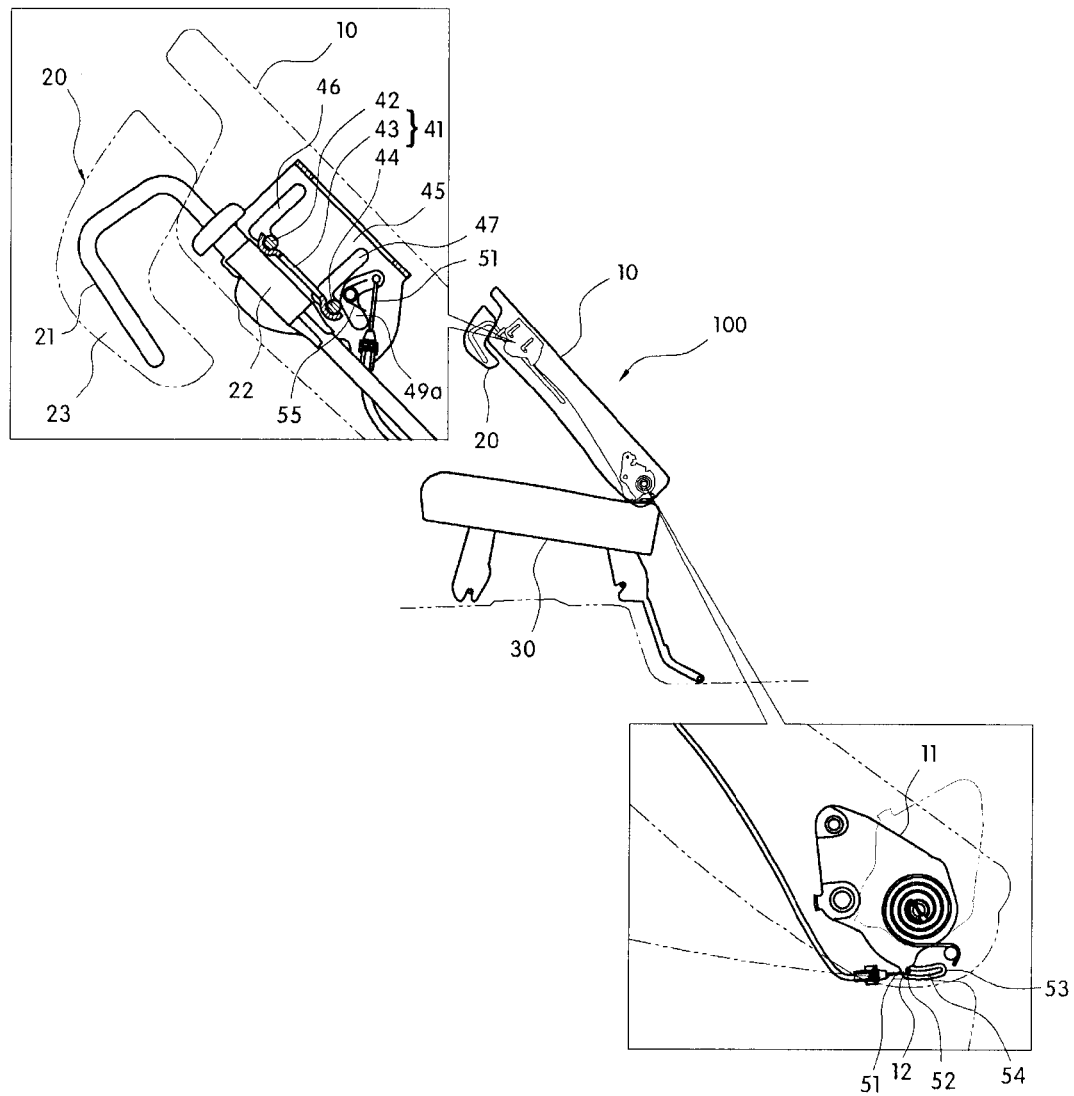

In further embodiments, when a seat back folding operation is suitably performed, the working protrusion 12 of the seat back frame 11 contact the cable pin 52, for example as illustrated in the lower portion of FIG. 10, and the working protrusion then pushes the cable pin 52 to the rear. Thus, in further related embodiments, the cable pin 52 moves to the rear along the guide slot 54 of the cable guide 53. At this point, the cable 51 is suitably pulled. The lower portion of FIG. 11 illustrates the working protrusion 12 suitably pushes the cable pin 52 to the rear completely with the seat back folding operation completed.

In certain embodiments of the invention as described herein, when the cable 51 is pulled as described above, the locking release lever 49a on the upper portion of the seat back 10 is pulled, and accordingly, the two locking release levers 49a and 49b rotate simultaneously, so that the end of each locking release lever pushes upward the lower horizontal rod 44. In related embodiments, the lower horizontal rod 44 and the upper horizontal rod 42 are released from the locking slots 46a and 47a of the corresponding guide slots 46 and 47, so that the locking state of the headrest fixing member 41 is suitably released.

According to further embodiments, when the front side of the headrest main body 23 suitably contacts the seat cushion 30 and is pressed by the seat cushion 30, the entire headrest assembly is slid to the rear. Further, the return springs 48a and 48b are stretched and the upper and lower horizontal rods 42 and 44 move to the rear along the corresponding guide slots 46 and 47, respectively. As illustrated in FIG. 11, the entire headrest assembly 20 including the headrest fixing member 41 is suitably moved to the rear by the pressing force of the seat cushion 20.

As described above, according to exemplary embodiments of the present invention, when the seat back is folded, the locking state of the headrest assembly 20 is suitably released and the headrest is slid to the rear by the seat cushion 30. With the headrest slid to the rear, the seat back folding operation is completed.

When the seat back 10 is restored (unfolded) from the state where the seat back is completely folded, the seat back is raised and the pressed state of the cable pin 52 by the working protrusion 12 is released. Accordingly, the upper and lower horizontal rods 42 and 44 are pulled by the elastic force of the return springs 48a and 48b, and the upper and lower horizontal rods 42 and 44 simultaneously move to the front along the guide slots 46 and 47 of the headrest slide guide 45, respectively.

According to certain exemplary embodiments, the entire headrest assembly 20 including the headrest fixing member 41 slides and projects to the front again, when the seat back 10 is completely restored (unfolded), the upper and lower horizontal rods 42 and 44 are fit into the locking slots 46a and 47a of the guide slots 46 and 47 while the return springs 48a and 48b are pulled, so that the headrest assembly 20 is locked again.

According to exemplary embodiments of the present invention, during a seat state allowing a passenger to sit, the headrest remains projected from the front side of the seat back in accordance with a projection height prescribed by the related regulation. According to other embodiments, during a seat back folding operation, locking of the headrest is automatically released in cooperation with the operation of the seat back, and slid to the rear by the seat cushion, so that the seat back folding operation can be swiftly completed.

The headrest apparatus according to various embodiments of the present invention has a exemplary construction in which the cable of the locking release unit suitably releases the locking state of the headrest assembly on the first place while the seat back is folded, and the front side of the headrest main body is pressed by the seat cushion and the entire headrest assembly is slid to the rear while the seat back folding operation (rotation of the seat back) is additionally performed. Accordingly, in other exemplary embodiments, for the headrest assembly to be slid to the rear, the headrest assembly main body is suitably pressed by the seat cushion.

Accordingly, in related embodiments, a headrest apparatus that allows a headrest assembly to be automatically pulled and slid to the rear while the seat back is folded even though a headrest main body is not pressed by a seat cushion, is provided.

FIGS. 12 to 17 are exemplary views illustrating a headrest apparatus according to other exemplary embodiments of the present invention. Exemplary constructions according to further embodiments of the invention that allow a headrest assembly to be slid to the rear without pressing of the seat cushion is described with reference to FIGS. 12 to 17.

First, in addition to the construction as described herein, the headrest apparatus may further include a slide drive unit delivering rotational force of the seat back 10 to automatically slide a headrest assembly 20 to the rear while a seat back is folded.

According to certain embodiments, the slide drive unit includes a cable 61, one end of which is suitably coupled to the headrest assembly 20, and the other end of which is suitably coupled to a cushion frame 31, to pull the headrest assembly 20 to the rear using rotational force of the seat back 10 while the seat back 10 is folded. According to other certain embodiments, the cable 61 is installed separately from a cable 51 of a locking release unit.

The cable 51 of the locking release unit is pulled by a working protrusion 12 of a seat back frame 11 to rotate a locking release lever 49a, while the cable 61 of the slide drive unit is pulled by a working protrusion 13 of the seat back frame 11 to pull the entire headrest assembly 20 to the rear while the seat back is folded.

According to other exemplary embodiments, the slide drive unit further includes, in addition to the cable 61, a cable guide 63 and the working protrusion 13, the cable guide 63 is fixedly installed to the cushion frame 31, and includes a suitable guide slot 64 to which a cable pin 62 installed on the other end of the cable 61 is inserted and coupled. In further embodiments, the working protrusion 13 protrudes from the lower end of the seat back frame 11 to push the cable pin 62 along the guide slot 64 of the cable guide 63 and thus allow the cable 61 to be pulled while the seat back is folded and the seat back frame rotates.

In further exemplary embodiments, the cable guide 63 is suitably installed to the exemplary position of the cushion frame on the opposite side of a cable guide 53 of the locking release unit, and the working protrusion 13 of the slide drive unit protrudes from the lower end position of the seat back frame opposite to a working protrusion 12 of the locking release unit.

Figure 12:
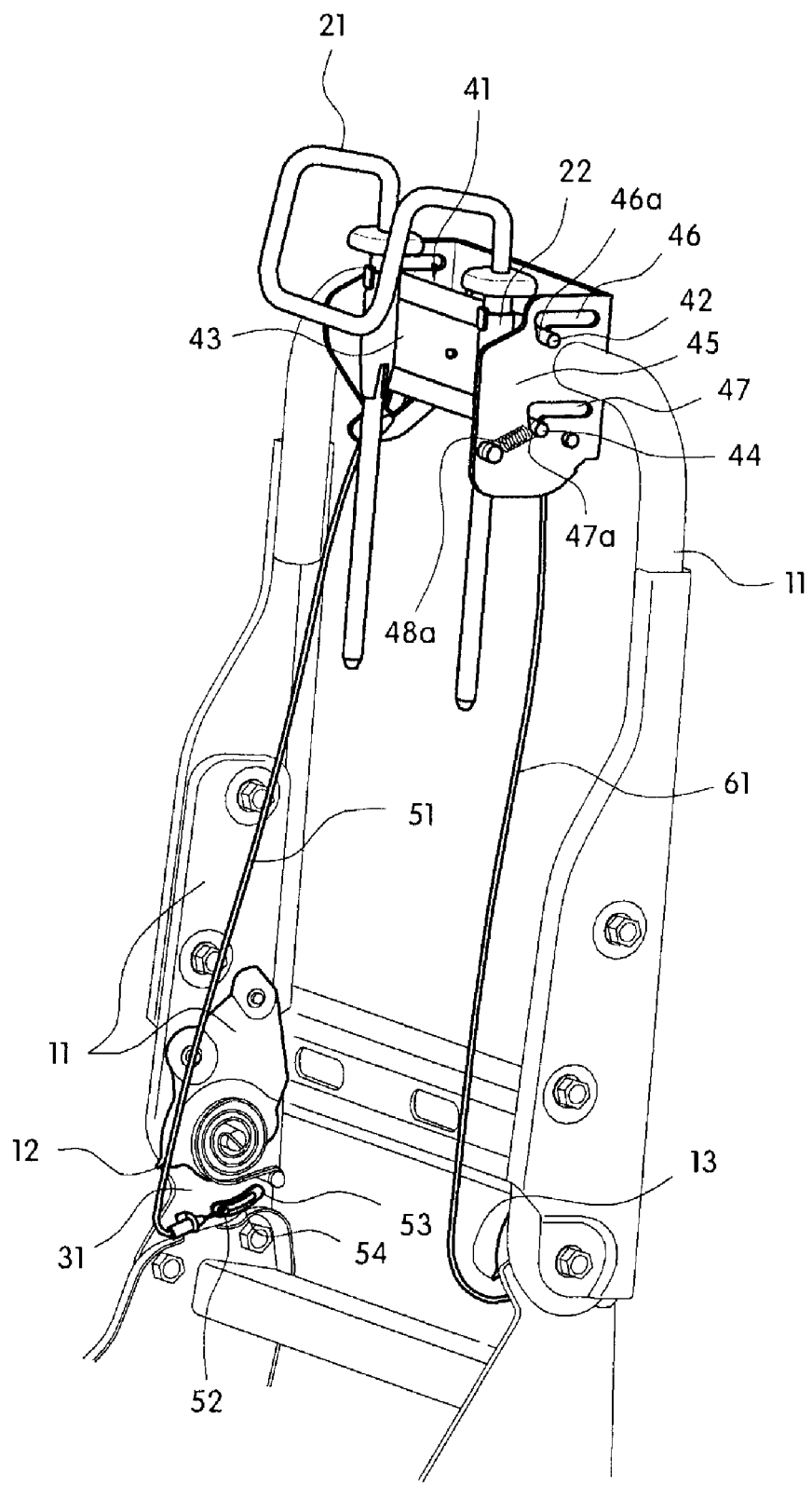
FIGS. 12 to 17 are views illustrating a headrest apparatus according to another exemplary embodiment of the present invention.

Referring to FIG. 12, according to exemplary embodiments of the invention, one end of the cable 51 of the locking release unit is coupled to the locking release lever 49a, and a cable pin 52 on the other end is coupled to a cable guide 53 fixedly installed on the left or right side of the cushion frame (the cable guide 53 is fixedly installed on the right side of the cushion frame in the example of FIG. 12), but one end of the cable 61 of the slide drive unit is coupled to a headrest fixing member 41 fixedly installed to a headrest guide 22, and the cable pin 62 on the other end is coupled to the cable guide 63 on the cushion frame position (cushion frame position on the left lower end in the example of FIG. 12) opposite to the cable guide of the locking release unit.

Figure 13:
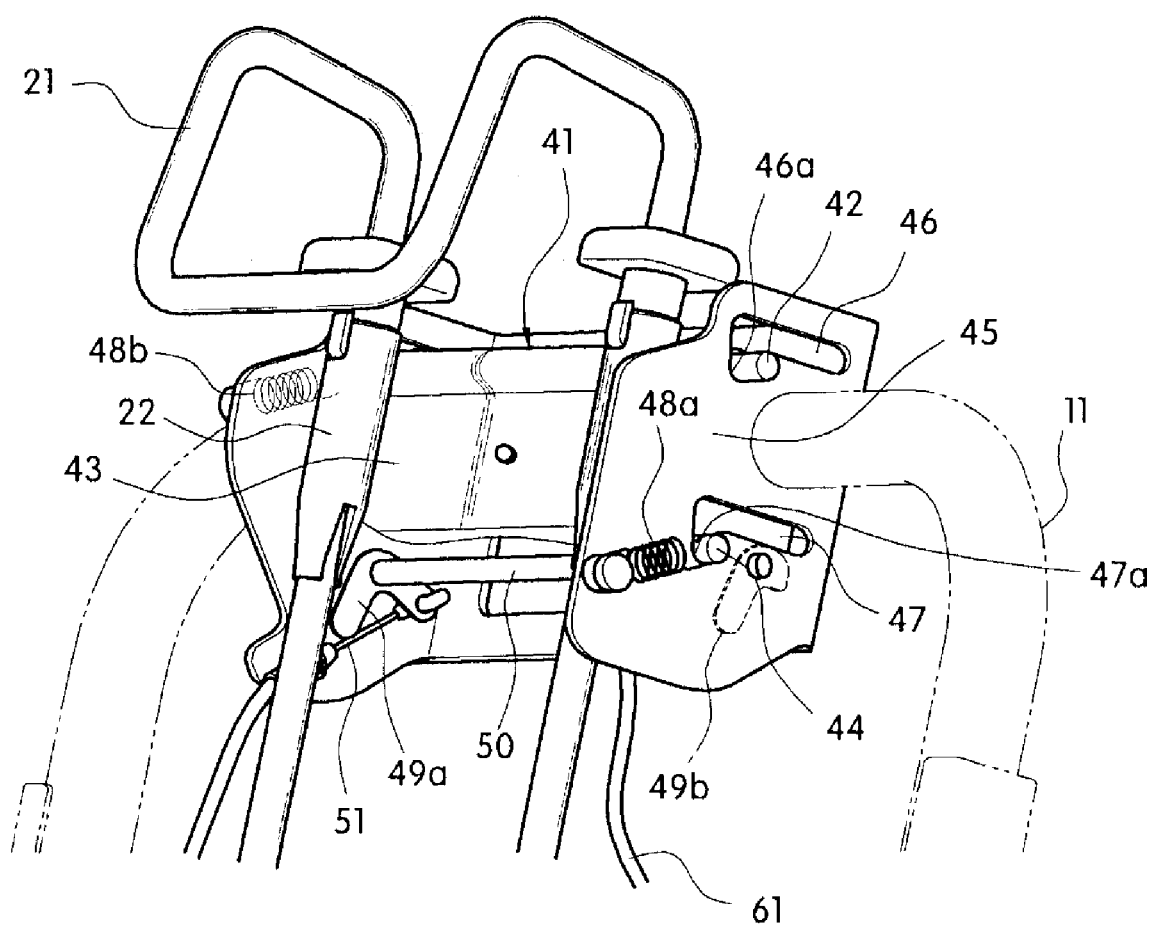

Referring to FIG. 13, in certain embodiments, one end of the cable 61 of the slide drive unit is coupled to the center of the headrest fixing member 41 fixedly installed to the headrest guide 22 so that it can suitably pull the headrest assembly 20 from the rear.

Figure 14:
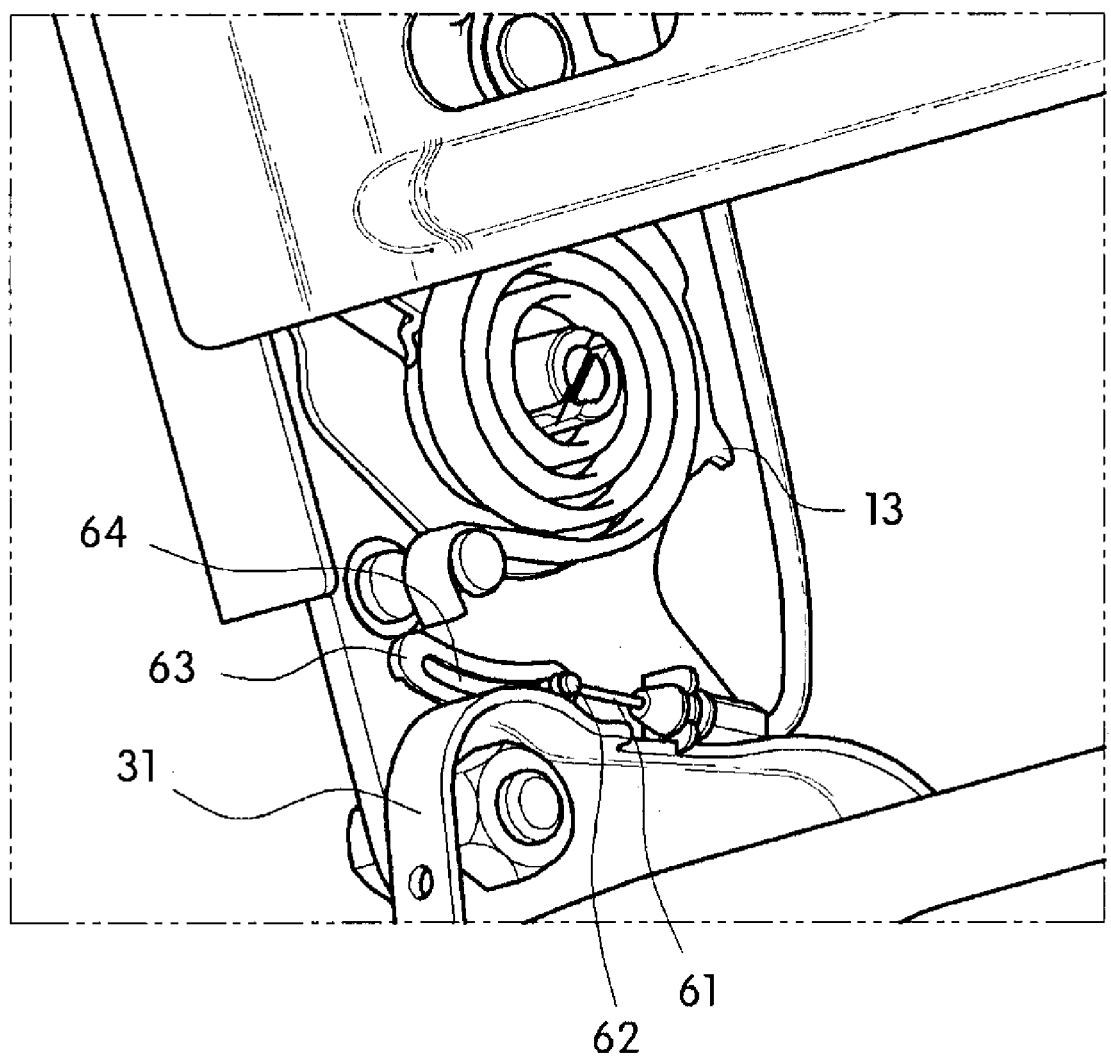

The construction that the cable pin 62 is installed at the other end of the cable 61, the cable guide 63 is fixedly installed to the cushion frame 31, and the cable pin 62 is inserted and coupled to the guide slot 64 of the cable guide 63 is the same as that of the locking release unit as illustrated in FIG. 14, then, the two cables 51 and 61 of the seat in FIG. 12 are coupled to the corresponding cable guides, respectively, suitably installed on the relevant cushion frame positions on left and right by the medium of the cable pins. In related embodiments, these constructions are provided in the same configuration on the left and right of the seat.

In related embodiments, the headrest assembly 20 should slide to the rear after a locking state is released first. Therefore, the positions of the working protrusions 12 and 13 of the two units are suitably set so that the cable 61 of the slide drive unit can be pulled after the cable 51 of the locking release unit is pulled first and so locking is completely released by the locking release lever 49a. Accordingly, in certain embodiments, the working protrusion 12 of the locking release unit pushes the cable pin 52, and so the cable pin 52 is substantially or completely moved to a locking release position along the guide slot 54 of the cable guide 53, and then the working protrusion 13 of the slide drive unit pushes the cable pin 62.

Figure 15:
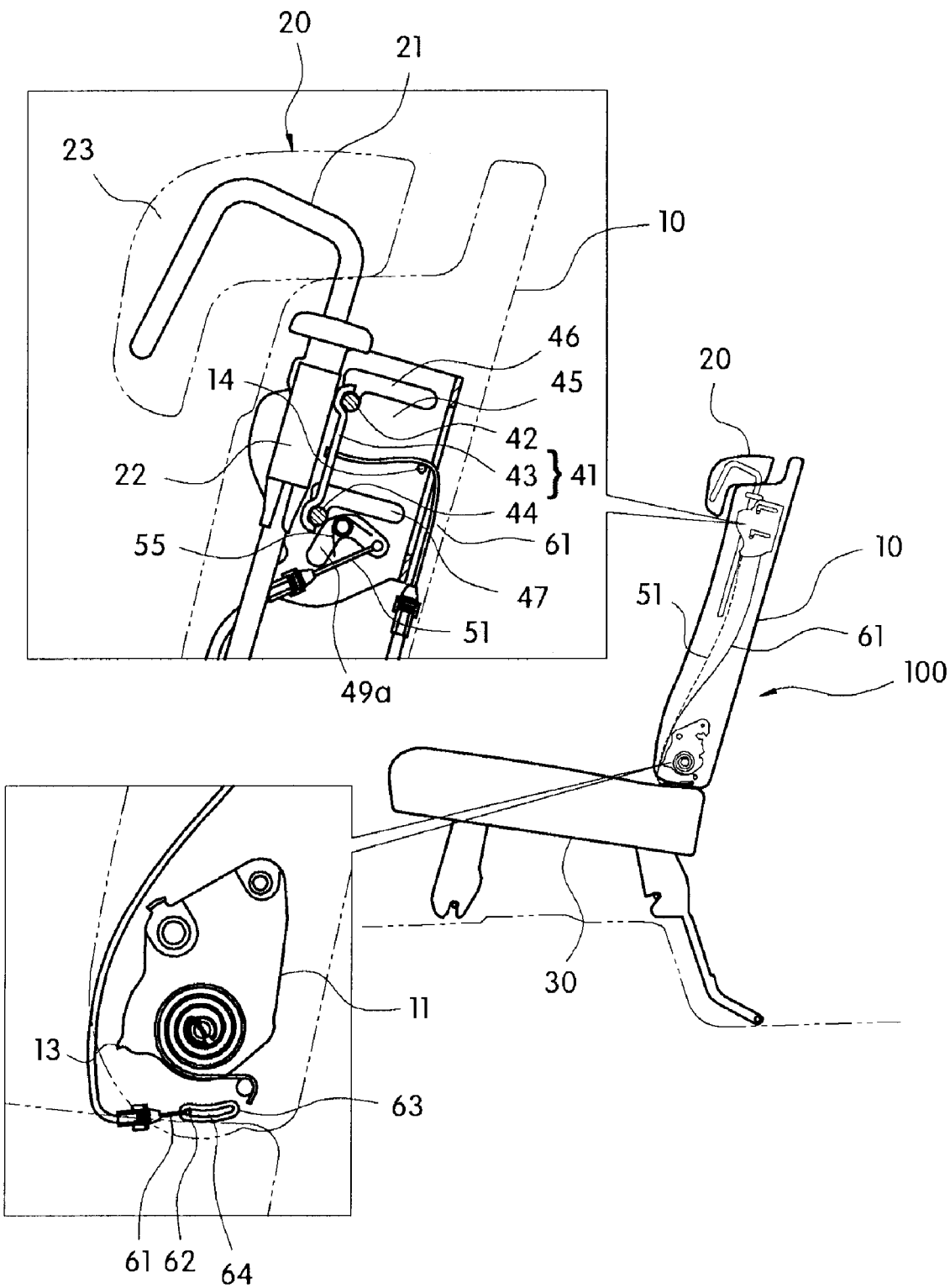
Figure 16:
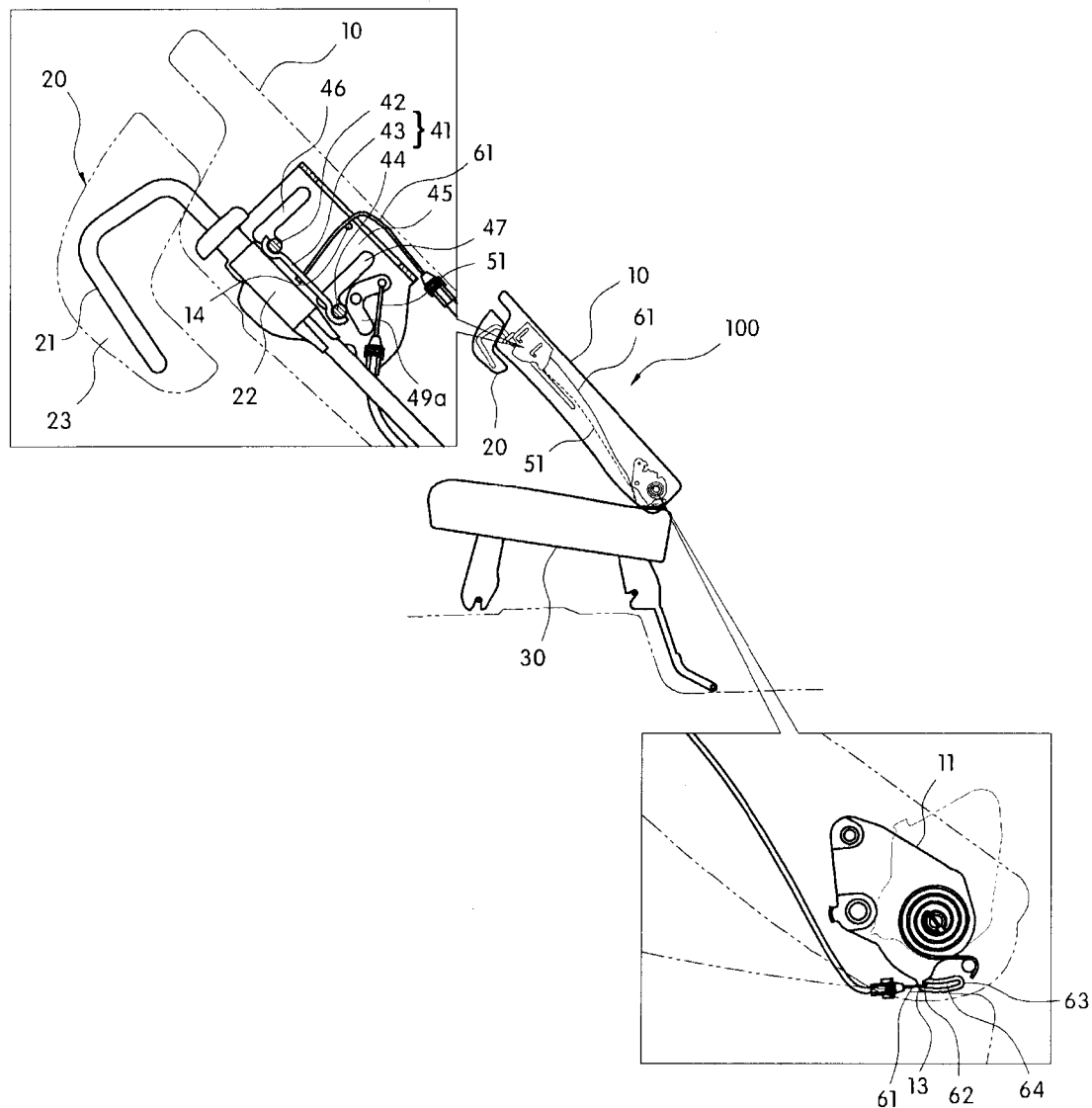
Figure 17:
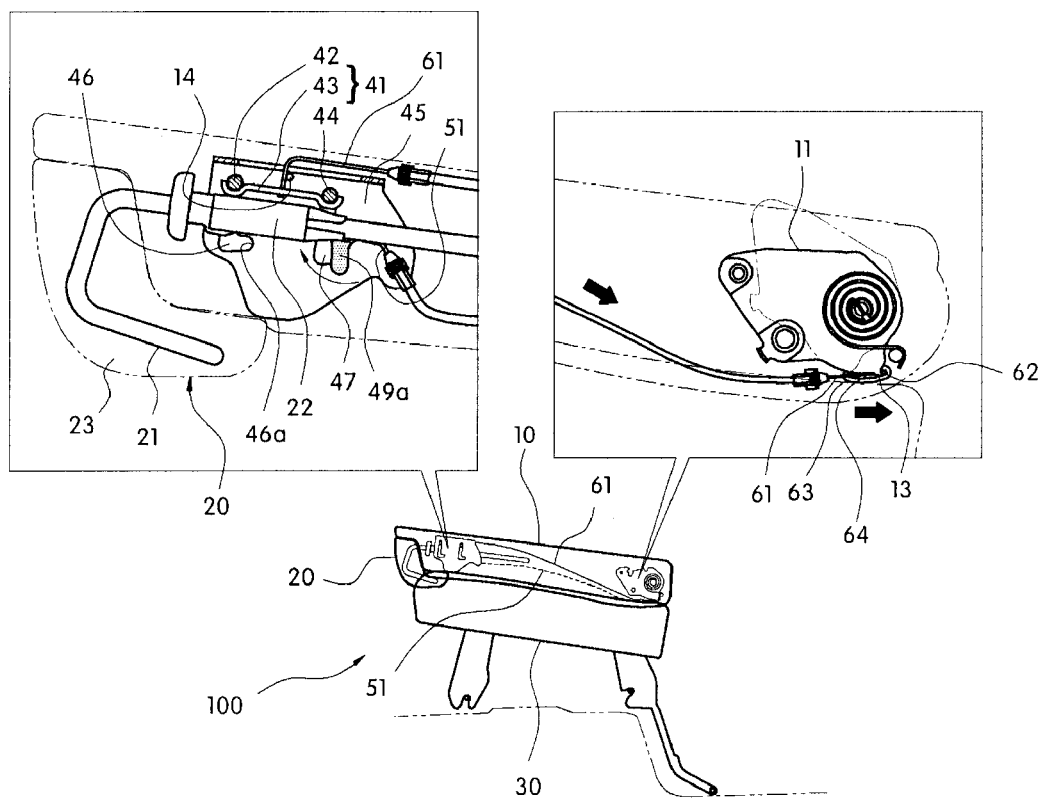

As illustrated in FIGS. 15 to 17, the cable 61 is hung on a wire 14 fixedly and horizontally installed on the seat back frame, and extends downward. The cable pin 62 installed at the lower end of the cable 61 is suitably inserted and coupled to the guide slot 64 of the cable guide 63. In related embodiments, while the seat back is folded, the working protrusion 13 pushes the cable pin 62 to the rear to move the cable pin along the guide slot 64, so that the cable 61 is pulled.

In other embodiments, the cable 61 is connected with the headrest fixing member 41 integrally fixed to the headrest assembly 20, and the entire headrest assembly 20 including the headrest fixing member can be pulled and moved to the rear when the cable 61 is suitably pulled. According to exemplary embodiments, since the process of pulling the cable of the slide drive unit in cooperation with a seat back folding operation as illustrated in FIGS. 15 to 17 is the same as that of pulling the cable of the locking release unit, detailed description thereof is omitted.

Various embodiments of the present invention further include the elastic member 55 so that locking release lever 49a can return to its original position. Furthermore, in an exemplary embodiment, one may appreciate that an elastic member may be disposed at end portion of the cable 51 and configured to bias the headrest fixing member 41 in a forward direction of the seat back 2.

As described above, according to certain exemplary embodiments, after the cable of the locking release unit is pulled first to release the locking state of the headrest assembly, the cable of the slide drive unit is then pulled to slide the headrest assembly to the rear.

For convenience in explanation and accurate definition in the appended claims, the terms "upper", "lower", "front" and "rear" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A headrest apparatus moveable from and to a seat back in cooperation with movement of the seat back, the apparatus comprising:
   a headrest fixing member connected to a headrest assembly and selectively movable in a forward or backward direction in the seat back;
   a guide member connected to a seatback frame inside the seat back, wherein the guide member including a guide portion and a locking portion guides forward and backward movement of the headrest fixing member;
   at least an elastic member coupling the guide member and the headrest fixing member and configured to bias the headrest fixing member in the forward direction of the seat back so that the headrest fixing member moves in the forward direction along the guide portion of the guide member and then is locked to the locking portion of the guide member by an elastic force of the elastic member when the seat back is unfolded; and
   a locking release unit pivotally coupled to the guide member and configured to release the headrest fixing member from the locking portion of the guide member in accordance with operation of the seat back when the seat back is folded,
wherein the headrest fixing member includes a headrest guide coupled to the headrest assembly to receive a headrest frame,
wherein the headrest fixing member comprises:
an upper horizontal rod;
a connection plate connected to the headrest guide, an upper end of the connection plate being fixed to the upper horizontal rod; and
a lower horizontal rod fixed to a lower end of the connection plate;
wherein the upper and lower horizontal rods coupled to the elastic member are slidably coupled to the guide member.

2. The apparatus of claim 1, wherein the elastic member comprises a first spring coupling the upper horizontal rod and the guide member and a second spring coupling the lower horizontal rod and the guide member.

3. The apparatus of claim 1, wherein the elastic member is coupled to the guide member with a predetermined angle from a longitudinal axis of the guide portion of the guide member toward the locking portion of the guide member.

4. The apparatus of claim 1, wherein the guide portion and the locking portion of the guide member are slots.

5. The apparatus of claim 1, wherein the locking release unit comprises:
a locking release lever rotatably coupled to the guide member and configured to release the headrest fixing member from the locking portion of the guide member while the seat back is folded; and
a release lever drive unit configured to activate the locking release lever by a rotational force of the seat back while the seat back is folded.

6. The apparatus of claim 5, wherein the release lever drive unit is fastened to a cushion frame pivotally connected to the seat back frame to activate the locking release lever by the rotational force on the seat back frame.

7. The apparatus of claim 6, wherein the release lever drive unit further comprises:
a cable coupled to the locking release lever;
a cable pin installed at one end of the cable;
a guide fastened to the cushion frame and including a guide slot, wherein the cable pin is inserted and coupled thereto;
a working protrusion configured to protrude from a lower end of the seat back frame,
wherein the working protrusion moves the cable pin along the guide slot of the guide around a rotation center of the seat back frame while the seat back is folded so as to cause the cable to be pulled to rotate the locking release lever.

8. The apparatus of claim 1, wherein the headrest assembly contacts a seat cushion and is pressed backwards by the seat cushion after the headrest fixing member is released from the locking portion of the guide member while the seat back is folded, and the headrest assembly moves into the seat back by the pressing force.

9. The apparatus of claim 1, further comprising a slide drive unit, one end of which is coupled to the headrest fixing member, the slide drive unit being configured to deliver rotational force of the seat back to the headrest fixing member to move backwards to the seat back the headrest fixing member disposed in the guiding portion of the guide member while the seat back is folded.

10. The apparatus of claim 9, wherein the other end of the slide drive unit is fastened to a cushion frame pivotally connected to the seat back frame to activate the headrest fixing member by rotational force of the seat back frame to move the headrest fixing member backwards in the guide portion of the guide member while the seat back is folded.

11. The apparatus of claim 10, wherein the other end of the slide drive unit comprises:
a guide fastened to the cushion frame and comprising a guide slot to which a cable pin installed at one end of a cable coupled to the headrest fixing member is inserted and coupled; and
a working protrusion configured to protrude from a lower end of the seat back frame to move the cable pin along the guide slot of the guide around a rotation center of the seat back frame while the seat back is folded so as to allow the cable to be pulled to move the headrest fixing member backwards.

12. A motor vehicle comprising the headrest apparatus of claim 1.

* * * * *